United States Patent [19]
Phillips

[11] Patent Number: 5,951,198
[45] Date of Patent: Sep. 14, 1999

[54] SHAFT AND SLEEVE COUPLING

[75] Inventor: Allyn E. Phillips, Salem, S.C.

[73] Assignee: Reliance Electric Industrial Company, Cleveland, Ohio

[21] Appl. No.: 08/928,577

[22] Filed: Sep. 12, 1997

[51] Int. Cl.[6] ........................................ F16B 2/14
[52] U.S. Cl. .................... 403/369; 403/370; 403/371
[58] Field of Search ........................ 403/371, 370, 403/369, 368, 367, 374.1, 374.2, 374.3, 373

[56] References Cited

U.S. PATENT DOCUMENTS

| | | | |
|---|---|---|---|
| 630,176 | 8/1899 | Brown | 403/370 |
| 2,680,633 | 6/1954 | Brown | 287/20.3 |
| 2,816,452 | 12/1957 | McCloskey | 403/371 X |
| 2,889,161 | 6/1959 | Powell et al. | 287/52.06 |
| 3,590,652 | 7/1971 | Strang | 287/52.06 |
| 3,917,425 | 11/1975 | Allaben, Jr. | 403/371 |
| 4,364,687 | 12/1982 | Adell | 403/370 |
| 4,367,053 | 1/1983 | Stratienko et al. | 403/371 |
| 4,452,547 | 6/1984 | Thiel et al. | 403/370 |
| 4,600,334 | 7/1986 | Soussloff | 403/369 |
| 4,626,114 | 12/1986 | Phillips | 384/584 |
| 5,174,680 | 12/1992 | Nakamura et al. | 403/370 |
| 5,176,464 | 1/1993 | Tanner | 403/371 X |
| 5,374,135 | 12/1994 | Folsom et al. | 403/369 |
| 5,474,403 | 12/1995 | Hetrich | 403/371 X |
| 5,553,966 | 9/1996 | Morelli et al. | 403/355 |
| 5,667,333 | 9/1997 | Phillips | 403/369 |

FOREIGN PATENT DOCUMENTS

| | | | |
|---|---|---|---|
| 272852 | 7/1965 | Australia . | |
| 56-80524 | 7/1981 | Japan | 403/371 |

Primary Examiner—Harry C. Kim
Attorney, Agent, or Firm—Patrick S. Yoder; John M. Miller; John J. Horn

[57] ABSTRACT

A coupling/mounting system for securing a shaft to a sleeve or hub includes an inner insert or bushing and an outer insert or bushing. The inner bushing has a slot permitting its radial compression during insertion into the hub. One or more radially extending projections are provided about the cylindrical outer periphery of the inner bushing. The projections enter into engagement in a corresponding recess within the bore. The inner bushing has a tapered inner surface that contacts a corresponding tapered outer surface of the outer bushing. The outer bushing has a elongated slot that permits its radial compression about the shaft when the system is assembled. The outer bushing includes mechanical features which permit it to be drawn into engagement between the inner bushing and the shaft, and thereby to exert radial forces for securing the shaft to the bore.

22 Claims, 4 Drawing Sheets

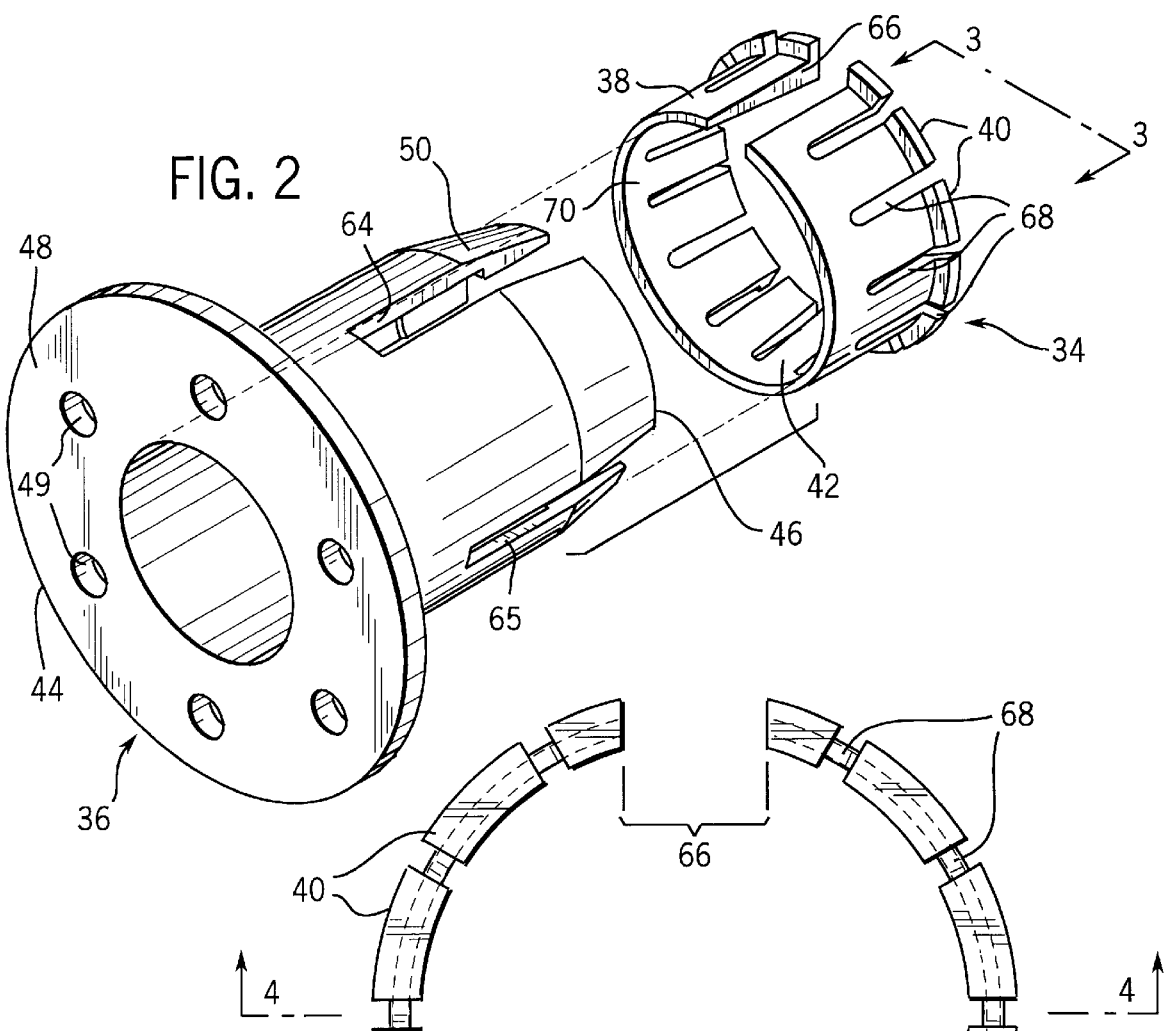
FIG. 2
FIG. 3
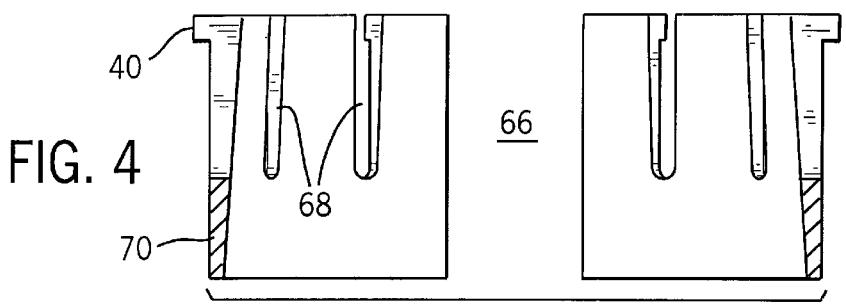
FIG. 4

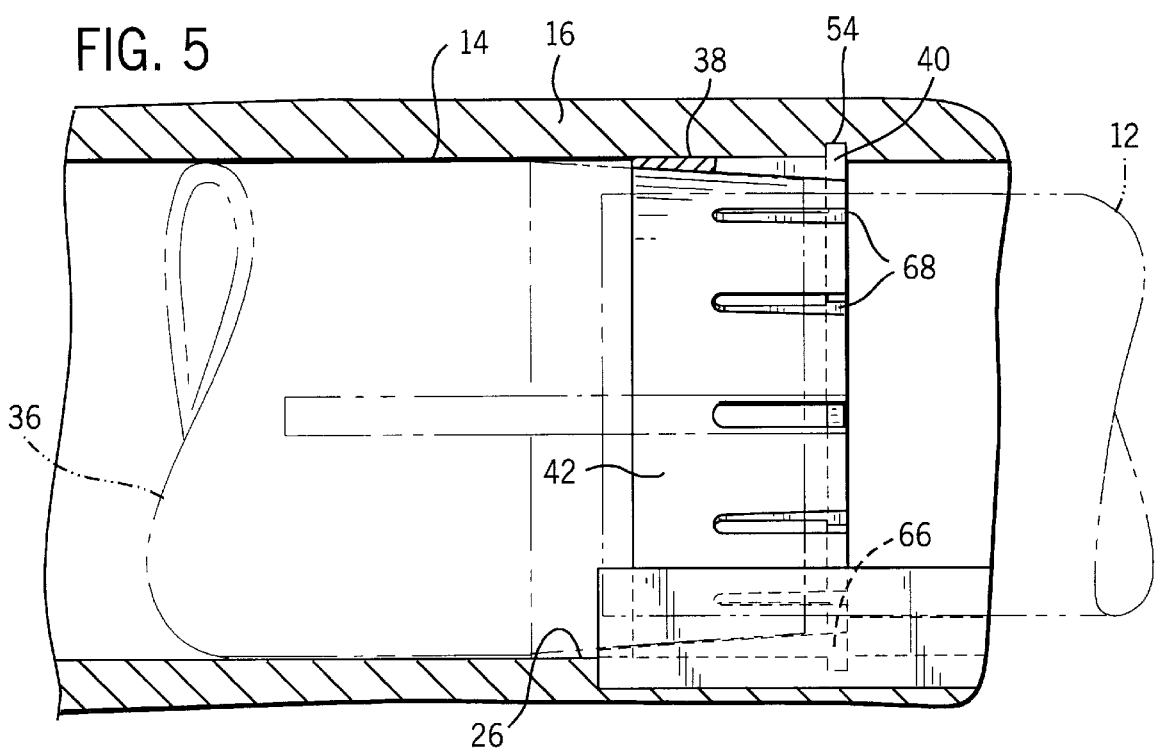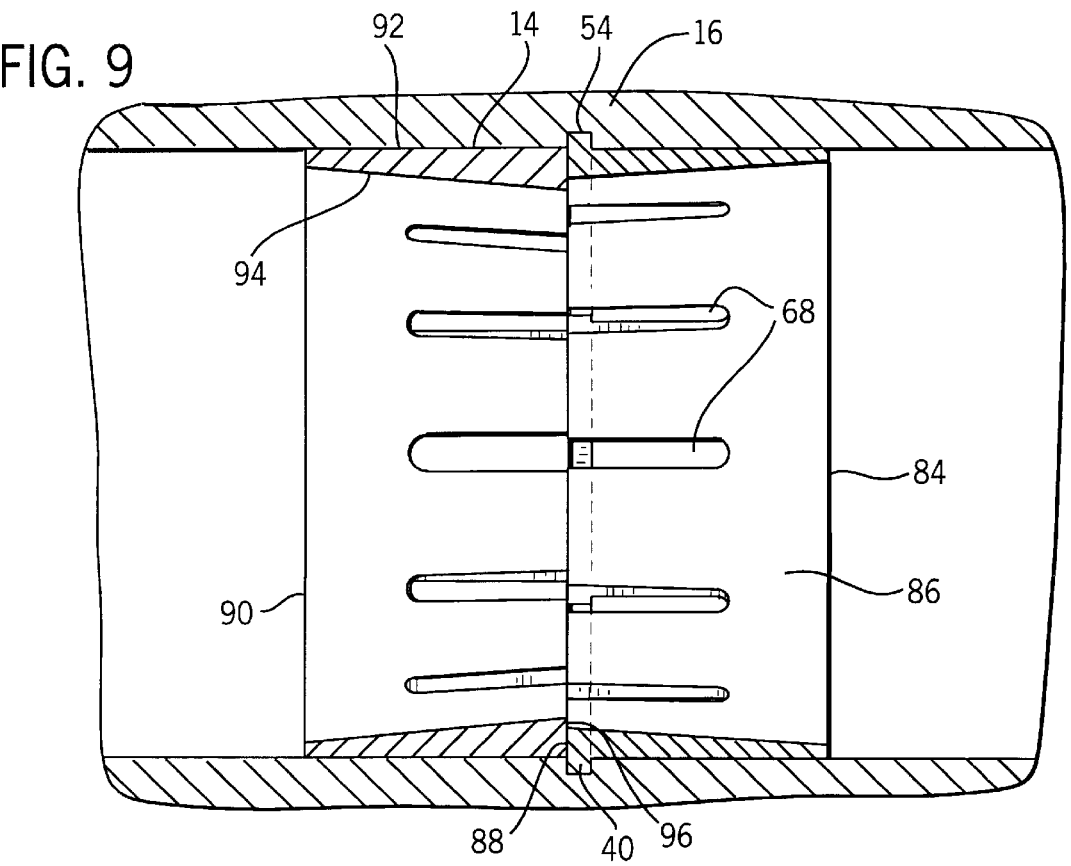

SHAFT AND SLEEVE COUPLING

BACKGROUND OF THE INVENTION

1. Field of the Invention

The present invention relates generally to the field of rotary coupling systems for mechanical power transmission. More particularly, the invention relates to an innovative technique for locating and securing a shaft with respect to a mating sleeve. The invention is particularly applicable to shaft or sleeve-supported structures, such as gear reducers and the like.

2. Description of the Related Art

Various arrangements have been proposed and are currently in use for connecting rotating machine elements to one another. In general, such arrangements enable rotating elements, such as shafts, sleeves, bushings and so forth to be coaxially aligned with one another and secured to one another in such a way as to transmit mechanical power between the coupled elements. Certain industrial applications require the coupling of a rotating shaft with a sleeve adapted to fit partially or entirely over the shaft. For example, in one such application, a gear reducer is hung from and supported by an output shaft, itself part of a machine drive system. In such applications, not only must the coupling system support torques transmitted between the rotating elements, but must also solidly fix the shaft and sleeve combination so as to support bending moments exerted by the overhung load.

Various locking structures have been devised for coupling shafts to sleeves, particularly for use with overhung loads such as shaft-mounted gear reducers. A number of these arrangements incorporate various wedge-type inserts that fit between the sleeve or hub and the shaft. The insert, typically formed as a frustoconical bushing, is inserted at an end of the sleeve. An annular flange bounds the base of the frustoconical element for facilitating its insertion and removal. In certain known arrangements, an annular flange of this type includes apertures for receiving fasteners. The fasteners are drawn toward the sleeve or hub by means of a cooperating annular flange fixed to the sleeve. Thus, by tightening the fasteners, the frustoconical element is forced into the sleeve. A tapered inner surface of the sleeve cooperates with a correspondingly tapered outer surface of the frustoconical element to drive the inner wall of the frustoconical element snugly against the shaft when the arrangement is assembled and the frustoconical element is wedged into place. An arrangement generally of this type is described in U.S. Pat. No. 4,626,114, issued to Phillips on Dec. 2, 1986.

While such arrangements provide solid attachment between hubs and shafts, they are limited in several important ways. For example, in the arrangement described above, the inner face of the sleeve or hub is typically an integral element of a gear reducer or other machine, and must be machined or otherwise profiled to provide the proper tapered surface against which the frustoconical element is brought to bear. The sleeve is therefore designed specifically to interface with a particular coupling system, reducing its universality for various applications. A system generally of this type is described in U.S. Pat. No. 3,590,652, issued to Strang on Jul. 6, 1971. Moreover, in certain applications, it is useful to employ a single long, tapered bushing, while in other arrangements a pair of shorter bushings on either end of the sleeve is more advantageous. The latter arrangement is particularly useful for shafts of considerable length, extending through or nearly through the entire sleeve. However, systems of the type described above generally are not well suited to the use of either a pair of bushings (i.e., one on either side of a sleeve) or a single long bushing (i.e., inserted into one end of the sleeve).

Other systems have been devised for interfacing sleeves having substantially cylindrical inner surfaces with shafts. In one such arrangement, an annular groove is formed within the sleeve for receiving an abutment ring. The ring is installed in the groove and serves as a backup member for a wedge-type bushing which is received within the sleeve bore. An interfacing wedge insert is then positioned between the inner bushing and the shaft. An annular flange on the insert receives fasteners for drawing the insert toward the sleeve, thereby locking the shaft and sleeve with respect to one another by the intermediary of the bushing and insert. While this system provides excellent torque transmission capabilities and supports heavy loads in a relatively universal arrangement, it too is not without drawbacks. For example, it has been found the placement of a snap-type backup ring in a groove formed deep within a sleeve can be difficult, particularly on larger machinery requiring robust backup rings. Moreover, in certain circumstances, the inner wedge-shaped bushing may become fixed between the tapered insert and the inner surface of the sleeve without initially abutting the backup ring. During subsequent use, the bushing may shift within the bore (e.g. towards the backup ring) loosening the coupling between the shaft and sleeve.

There is a need, therefore, for an improved shaft/sleeve coupling arrangement which does not suffer from the drawbacks of existing systems of the types described above. In particular, there is a need for an arrangement which can be easily installed and which remains effective at transmitting even substantial loads between driving and driven elements during use. Moreover, there is a need for a system that can be disassembled as needed and that offers the possibility of incorporating long and short tapered inserts in various combinations in a generally universal coupling system.

SUMMARY OF THE INVENTION

The present invention provides a novel wedge-type shaft/sleeve mounting structure designed to respond to these needs. The structure may be used in a variety of applications, including for attaching both driving shafts to driven sleeves and, vice versa, for securing driven shafts to driving sleeves. In addition to transmitting substantial loads, the system is particularly well suited to overhung loads, such as where a gear reducers or similar mechanical elements are supported on a driving or driven shaft. The system makes use of a wedge-shaped locking member which is received within a bore. The locking member interfaces with a tapered insert which can be driven between the locking member and a shaft inserted in the bore. In a particularly preferred arrangement, locking projections, such as in the form of an interrupted annular ring, are formed integrally on the sleeve, permitting it to be accurately positioned within the bore. The system may be employed with both long-engagement shafts (i.e., extending through a substantial portion of the bore) and with short-engagement shafts (i.e., having relatively short engagement within the bore).

Thus, in accordance with a first aspect of the invention, a system is provided for coupling a rotatable machine element to a shaft. The machine element has a bore for receiving the shaft. The bore, in turn, has a cylindrical side wall and a recess formed in the side wall. The shaft has a substantially cylindrical outer surface. The system comprises the first locking member, a second locking member, and means for urging the first and second locking members toward one another. The first locking member has a substantially cylindrical outer surface configured to bear against the side wall of the bore. Moreover, the first locking member includes a tapered inner surface, and a projection extending radially outwardly from the outer surface and configured to be received within the recess of the bore. The second locking member has a substantially cylindrical inner surface configured to bear against the outer surface of the shaft. A tapered outer surface on the second locking member is configured to bear against the tapered inner surface of the first locking member. The first and second locking members may be drawn toward one another by the urging means to force the first and second locking members into engagement with one another, thereby securing the shaft within the bore.

In a particularly preferred arrangement, the first locking member has at least one slot along its length to permit it to be compressed radially during insertion into the bore. The recess may be formed as an annular groove and the first locking member formed with a plurality of radially arranged projections configured to be received in the groove. The bore may be provided with one or more tapered portions, such as adjacent to either end thereof, for receiving secondary securement structures, such as tapered locking members. The latter arrangement is particularly useful in applications wherein the shaft extends through a substantial portion of the bore.

In accordance with another aspect of the invention, a system for coupling a rotatable machine element to a shaft includes first and second locking members, a backup member, and means for urging the first and second locking member toward one another. The first locking member has a substantially cylindrical outer surface configured to bear against the side wall of the bore. The first locking member also includes a tapered inner surface. The second locking member has a substantially cylindrical inner surface configured to bear against the shaft, and a tapered outer surface configured to bear against the tapered inner surface of the first locking member. The backup member has a radial projection configured to be received within a recess formed in the side wall of the bore. And axially-extending portion of radially smaller dimensions than the projection is configured to bear against the inner surface of the bore. The backup member maintains the first locking member in a predetermined position within the bore, permitting it to be wedged between the inner surface of the bore and the second locking member.

The invention also provides a locking bushing for a coupling system. The system includes a bore having a cylindrical inner side wall and a recess within the side wall. The system also includes a shaft having a cylindrical outer wall positionable within the bore. The system further includes a locking member having a tapered outer portion positionable within the bore and a cylindrical inner portion configured to contact the shaft. Means for urging the locking member axially into the bore are provided, such as in the form of annular flanges and cooperating fasteners. The locking bushing includes an elongated portion having a cylindrical outer surface configured to contact the side wall of the bore, and a tapered inner surface configured to contact the tapered outer portion of the locking member. The locking bushing further includes a locking projection integral with the elongated portion and extending radially outwardly with respect to the outer surface thereof. The locking projection is configured to be received within the recess formed in the side wall of the bore, to maintain the bushing at a predetermined position within the bore.

BRIEF DESCRIPTION OF THE DRAWINGS

The foregoing and other features of the invention will become apparent upon reading the following detailed description and upon reference to the drawings in which:

FIG. 2 is an exploded perspective view of cooperating locking members of the structure illustrated in FIG. 1;

FIG. 3 is an end view of the locking bushing illustrated in FIG. 2;

FIG. 4 is a sectional view through the locking bushing illustrated in FIG. 3, along the lines 4—4;

FIG. 5 is a sectional view of the locking bushing of FIGS. 3 and 4, positioned within a bore, prior to assembly with other elements of the mounting structure;

FIG. 9 is a sectional view of an alternative configuration wherein a first locking bushing includes securement projections around its periphery, while a second locking bushing abuts against the first locking bushing to determine its position within the bore.

DETAILED DESCRIPTION OF SPECIFIC EMBODIMENTS

Figure 1:
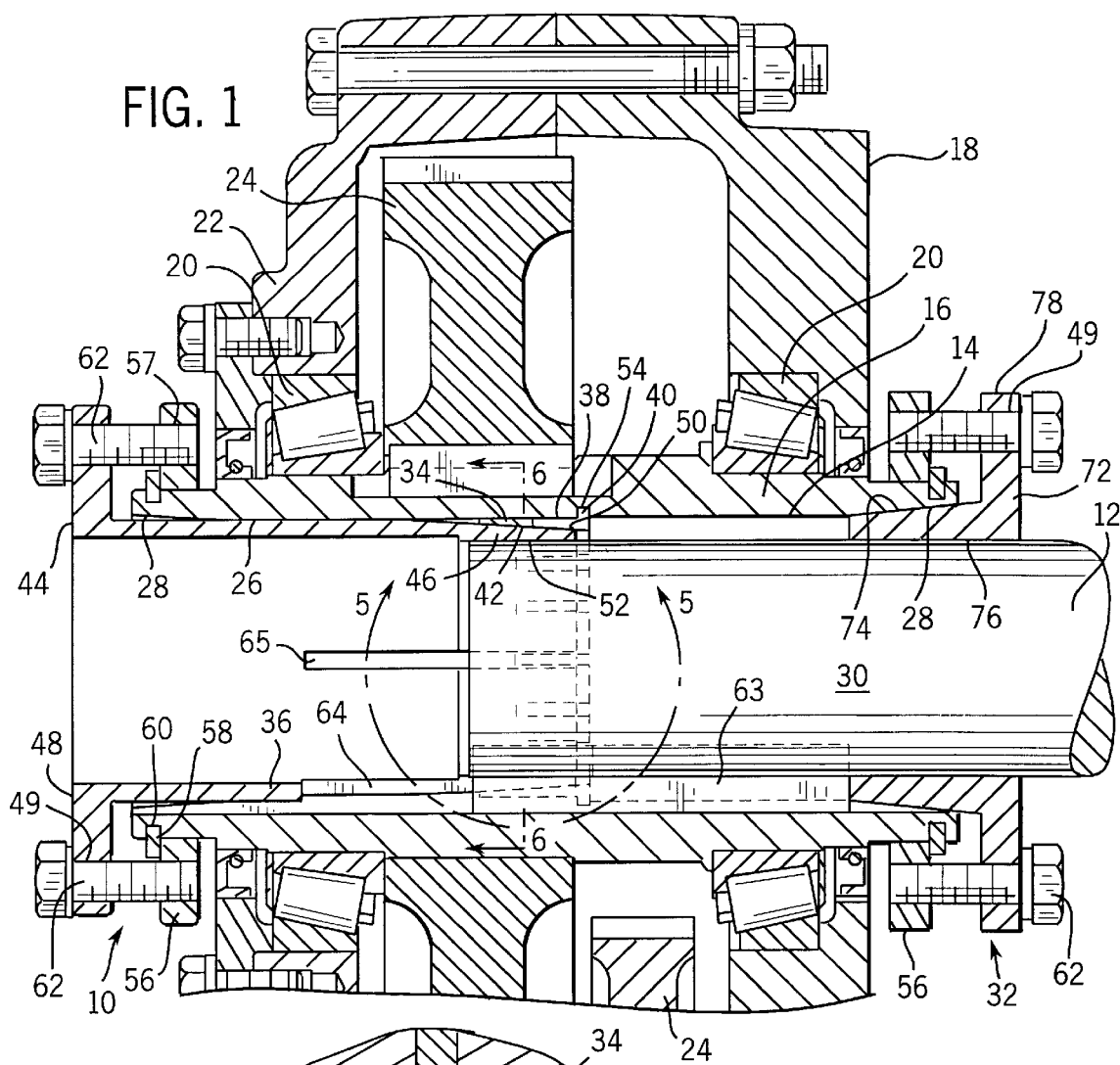
FIG. 1 is a sectional view through a portion of a gear reducer, illustrating a shaft/sleeve mounting structure in accordance with certain aspects of the invention installed between a shaft and a sleeve of the gear reducer.

Turning now to the drawings, and referring first to FIG. 1, an exemplary coupling/mounting system, designated generally by the reference numeral 10, is illustrated for securing a shaft 12 within a bore 14 formed in a sleeve or hub 16. In the embodiment illustrated in FIG. 1, hub 16 is an output hub of a gear reducer 18 designed to be supported or overhung on shaft 12. Such gear reducers typically include bearing sets 20 for supporting hub 16 within a housing 22, as well as a series of reduction gears 24. It should be noted, however, that while reference is made throughout the present description to a sleeve or hub 16, the system described herein may be applied in a variety of applications wherein a male member 12 is to be rotatably secured within a female member 16. Thus, shaft 12 may be a full or hollow shaft, and may extend partially or entirely through bore 14. Similarly, while in the embodiment shown and described herein, shaft 12 extends from an end of bore 14 opposite system 10, shaft 12 may be inserted through system 10 to engage the system in an intermediate region in a manner similar to that described below, without deviating from the structure or function of the elements disclosed herein.

System 10 is particularly well suited for installation within a bore 14 having a generally cylindrical inner side wall or surface 26. Tapered portions 28 may be conveniently formed near end regions of bore 14 to accommodate secondary securement assemblies as described below. Shaft 12 has a cylindrical outer surface 30 appropriately dimensioned to slip within bore 14, as well as through the elements of system 10 as more fully described below. Where appropriate, system 10 may be utilized in combination with a secondary securement assembly 32. The illustrated embodiment is particularly useful where shaft 12 extends to a sufficient depth within bore 14 to permit the use of system 10 within an interior region, along with a shorter securement assembly 32 near an end of bore 14.

Coupling/mounting system 10 includes a pair of generally frustoconical sleeves or bushings configured to cooperate with bore 14 and shaft 12, and with one another to exert radial forces on both shaft 12 and bore 14 sufficient to maintain these elements in a desired axial position with respect to one another. Thus, system 10 includes an inner bushing 34 and an outer bushing 36. Inner bushing 34 has a generally cylindrical outer surface 38 configured to slide within and subsequently abut against inner surface 26 of bore 14. A series of radial projections 40 extend around an end of inner bushing 34 to maintain bushing 34 in place within bore 14 as described below. Inner bushing 34 has a tapered inner surface 42 designed to contact and ride against a portion of outer bushing 36.

Outer bushing 36 forms an elongated hollow sleeve member having an outer end 44 and an inner end 46. An annular peripheral flange 48 is provided around outer end 44 to facilitate the assembly of system 10 as described below. Radially spaced fastener apertures 49 are formed through flange 48. An outer tapered portion 50 is formed around inner end 46. The taper angles of inner surface 42 of inner bushing 34 and of outer portion 50 of outer bushing 36 are similar to one another such that these two areas conform abutingly to one another when system 10 is assembled. Outer bushing 36 has an inner cylindrical portion 52 appropriately dimensioned to slip over outer surface 30 of shaft 12, but which is compressed into tight engagement on shaft 12 when system 10 is assembled. Outboard of inner cylindrical portion 52, outer bushing 36 has an inner diameter sufficient to permit a shaft to be extended therethrough.

It should be noted that while tapered surfaces 42 and 50 extend only along a relatively short portion of bore 14 in the illustrated embodiment, the relative lengths and positions of these surfaces may be adapted to the exigencies of particular applications. Similarly, the relative position of inner bushing 34 within bore 14 may be adjusted to provide for engagement between bore 14 and shaft 12 at various locations along these members. Thus, although the engagement region between inner bushing 34 and outer bushing 36 is illustrated as being advantageously located near a midpoint of bore 14, the particular point of engagement may be provided nearer to one end of bore 14 as desired.

Sleeve or hub 16 includes several features designed to interface with the elements of system 10 during assembly of the system. A first of these features is an inner recess or groove 54 formed within bore 14. In the illustrated embodiment recess 54 is an annular groove turned within cylindrical surface 26. Alternative configurations could include interspersed recesses, drilled radial apertures, and so forth. Recess 54 is configured to receive projections 40 of inner bushing 34 when inner bushing 34 is installed within bore 14. A retaining flange 56 is provided near an outboard end of sleeve or hub 16 to permit outer bushing 36 to be drawn into engagement with inner bushing 34. Retaining flange 56 is held in place on hub 16 via a snap ring 58 lodged within an outer annular groove 60. Retaining flange 56 includes a plurality of axially oriented threaded fastener apertures 57 designed to receive fasteners 62 for drawing outer bushing 36 toward flange 56, and thereby, into engagement between bushing 34 and shaft 12. In the illustrated embodiment, apertures 49 formed through flange 48 are sized just larger than fasteners 62, while apertures 57 formed in a retaining flange 56 are tapped to threadingly engage fasteners 62.

In addition to the features described above, sleeve or hub 16 and shaft 12 preferably include keyways 61 extending along a substantial portion of their length. A key 63 is positionable in the keyways in both sleeve 16 and shaft 12 to assist in carrying torque between these elements in a conventional manner. Moreover, both inner bushing 34 and outer bushing 36 are preferably configured to receive key 63 when system 10 is assembled as described in greater detail below.

FIGS. 2, 3 and 4 illustrate a particularly preferred configuration of inner bushing 34 and outer bushing 36. As shown in FIG. 2, outer bushing 36 includes an elongated slot 64 extending along a portion of its length to permit outer bushing 36 to be radially flexed slightly during tightening of system 10. Alternatively, slot 64 may extend through the entire length of bushing 36. Slot 64 is preferably sufficiently wide to receive key 63 positioned between bore 14 and shaft 12. One or more additional slots 65 may be provided around inner end 46 to provide additional resiliency to bushing 36. A similar through slot 66 is formed in inner bushing 34. Slot 66 is also preferably of sufficient width to receive key 63 between bore 14 and shaft 12. To further facilitate radial compression of inner bushing 34, a series of slots 68 extend between projections 40 and through a portion of inner bushing 34, leaving an open frontal ring 70 near an outboard end of inner bushing 34.

While inner bushing 34 may be conveniently formed by a variety of casting or machining methods, in the preferred embodiment, bushing 34 is first turned from metal stock to define an annular lip corresponding to projections 40, cylindrical outer surface 38, and tapered inner surface 42. The blank thus produced is then sawed or milled to produce through slot 66 and partial slots 68. It has been found that the provision of a plurality of radially positioned slots 68 facilitates compression of bushing 34 during insertion into bore 14, particularly when bushing 34 is formed from steel or cast iron.

The elements of system 10 described above are assembled between shaft 12 and bore 14 as follows. As best shown in FIG. 5, inner bushing 34 is first inserted into bore 14 by compressing bushing 34 radially until projections 40 clear inner surface 26. Bushing 34 may then be forced axially into bore 14 until projections 40 lie in mutually facing relation with respect to recess or groove 54. Inner bushing 34 then expands to lodge projections 40 within recess 54 as shown in FIG. 5. As compared to heretofore known systems utilizing thin backup rings, such as snap rings, positioned within an inner annular groove, it has been found that the provision of a cylindrical outer surface extending from projections 40 greatly facilitates insertion and placement of inner bushing 34 within bore 14. Moreover, in the preferred embodiment illustrated, the unitary or integral nature of bushing 34 ensures that tapered inner surface 42 will be accurately located within bore 14 with respect to recess 54.

Once inner bushing 34 has been positioned within bore 14, outer bushing 36 may be brought to bear against bushing 34. Outer bushing 36 is preferably slid into bore 14 and loosely positioned by beginning engagement of fasteners 62 within apertures 57 provided in flange 56. This initial alignment of bushing 36 within bore 14 brings tapered inner surface 42 of inner bushing 34 and tapered outer portion 50 of outer bushing 36 into initial engagement without substantially compressing either member. Shaft 12 may then be positioned within bore 14 and slid into position within inner cylindrical portion 52 of outer bushing 36. As mentioned above, shaft 12 may be inserted into bore 14 either through the end thereof opposite system 10 (as shown) or through the end in which system 10 is installed (i.e., through bushing 36). Fasteners 62 are then tightened to draw outer bushing 36 toward retaining flange 56 and thereby toward inner bushing 34. Progressive engagement of tapered portions of inner and outer bushings 34 and 36 results in radial compression of outer bushing 36 such that inner and outer bushings 36 become tightly compressed between shaft 12 and bore 14, exerting substantial holding forces. It should be noted that other sequences of assembly may be employed. For example, when shaft 12 is inserted from the end of bore 14 in which a secondary securement assembly 32 is installed, as described below, outer bushing 36 may be installed after insertion of shaft 12.

Figure 6:
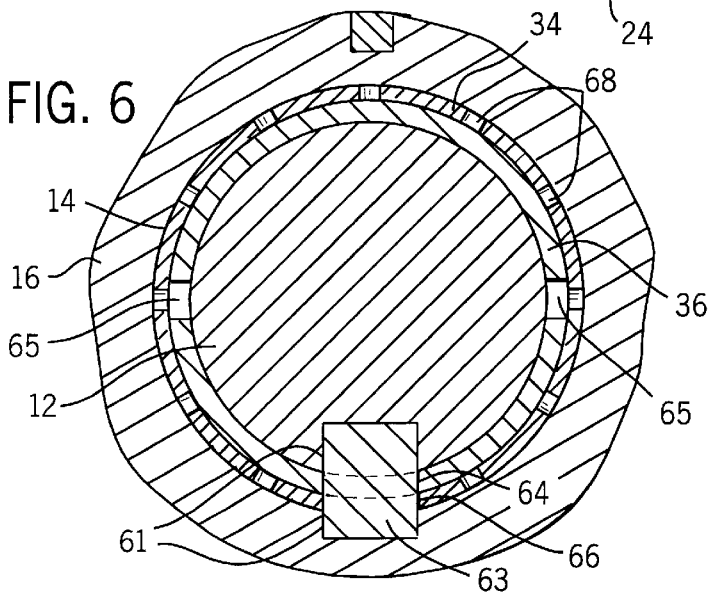
FIG. 6 is a sectional view through the assembled elements illustrated in FIG. 1 along line 6—6, depicting their relative positions between the bore and shaft after installation.

FIG. 6 illustrates the arrangement of certain of the components of system 10 following assembly. As shown in FIG. 6, once outer bushing 36 is secured within inner bushing 34, shaft 12 is securely coupled to sleeve or hub 16. Inner bushing 34 is thus compressed between outer bushing 36 and bore 14, spanning key 63 which is lodged in keyways 61 of both shaft 12 and sleeve 16. Similarly, outer bushing 36 is compressed and lodged between inner bushing 34 and shaft 12, spanning key 63.

As mentioned above, system 10 may include, and function in cooperation with a secondary securement assembly 32 to provide support for shaft 12 and bore 14 at spaced locations along shaft 12. Thus, returning to FIG. 1, such a secondary securement assembly 32 may include a short outer bushing 72 affixed adjacent to an end of sleeve or hub 16. In the illustrated embodiment, bushing 72 includes an outer tapered portion 74 configured to engage and cooperate with a tapered portion 28 provide within bore 14. A cylindrical inner portion 76 extends beneath outer tapered portion 74 to engage shaft 12. A compression slit (not illustrated) is provided along bushing 72 to allow it to be radially compressed about shaft 12 when installed. A peripheral flange 78 is provided on an outboard end of tapered portion 74 and cylindrical portion 76. Flange 78 may be generally identical to peripheral flange 48 of outer bushing 36 described above. Thus, flange 78 includes a plurality of fastener apertures 49 designed to receive and cooperate with fasteners 62. As describe above, fasteners 62 are threaded within corresponding apertures formed within a retaining flange 56 mounted adjacent to an end of hub or sleeve 16. Following assembly about shaft 12, as fasteners 62 are drawn into engagement within retaining flange 56, bushing 72 is drawn into tapered portion 28, radially compressing bushing 72 between tapered portion 28 and shaft 12.

While the particular arrangement of inner bushing 34 described above is presently preferred, various alternative configurations may be envisioned by those skilled in the art without departing from the scope and spirit of the appended claims. For example, while in the preferred configuration described above, inner bushing 34 and outer bushing 36 are made of a relatively rigid metallic material, such as steel or cast iron, for lighter load applications or where corrosion resistance is desired, one or both of these elements may be made of composite materials or plastic. In the latter case, some or all of the features of these elements may be defined during a molding process. Similarly, where inner bushing 34 is made of a suitable metal, manufacturing processes such as casting, injection molding, sintered metal fusing and the like may be employed to form the bushing and some or all of the structural features described above.

Figure 7:
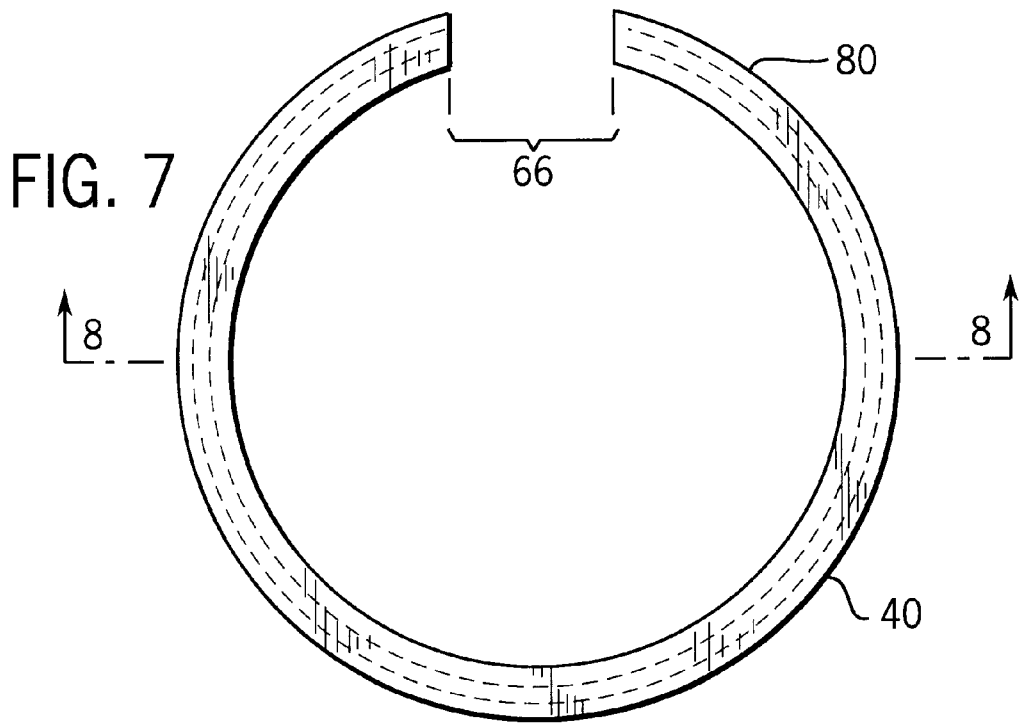
FIG. 7 is an end view of an alternative configuration for a locking bushing for use in a system of the type illustrated in FIG. 1.
Figure 8:
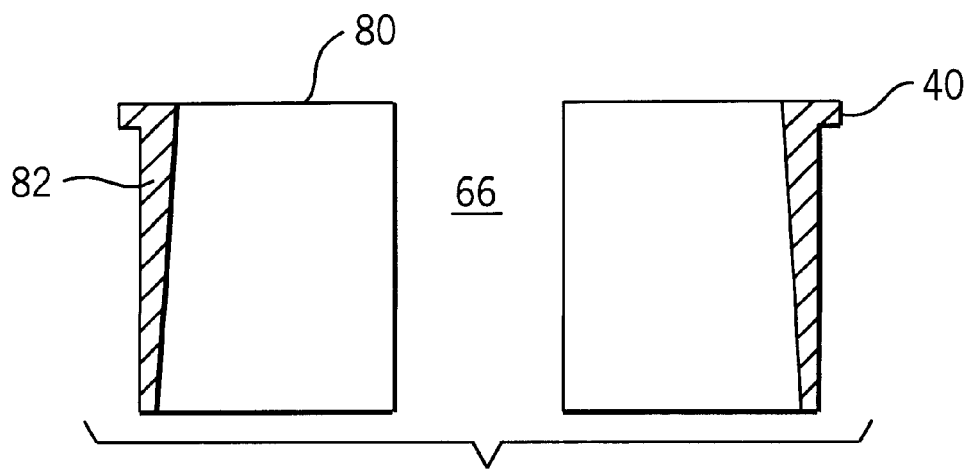
FIG. 8 is a sectional view through the locking bushing illustrated in FIG. 7, along line 8—8.

FIGS. 7 and 8 illustrate another alternative configuration of inner bushing 34, designated generally by the reference numeral 80. As shown in these figures, bushing 80 includes a continuous wedge-shaped side wall 82 extending between a generally annular locking projection 40 and a forward end. A single elongated slot 66 is formed through bushing 80 to permit it to be compressed radially during insertion into bore 14. The configuration illustrated in FIGS. 7 and 8 is particularly suitable for sizes of the bushing wherein sufficient compression can be obtained without the use of partial length slots 68 as described above. In general, bushing 80 need be compressed only sufficiently to permit projection 40 to pass within the interior of bore 14 for placement of bushing 80 prior to final assembly of system 10.

FIG. 9 represents components of a further alternative configuration of the system described above. As shown in FIG. 9, a backup ring or bushing 84 may be provided within bore 14, and serve as an abutment ring for a slip-in locking bushing 90. In general, backup bushing 84 may be configured similar to inner bushing 34 described above, including a cylindrical outer surface 38 and locking projections 40 which enter into engagement in a recess 54 provided within bore 14. An inner surface 86 of backup bushing 84 may be tapered as illustrated in FIG. 9 or, where bushing 84 is used only for backup purposes, may be generally parallel to cylindrical outer surface 38. Slots 68 are provided radially around bushing 84, in combination with a through slot (not shown), permitting bushing 84 to be radially compressed during insertion into bore 14. A rear abutment surface 88 is provided on bushing 84 against which slip-in locking bushing 90 rides when assembled within bore 14. Slip-in locking bushing 90 includes a generally cylindrical outer surface 92 and a tapered inner surface 94. Radial compression slots 68 are formed about bushing 90 to permit its radial compression. Alternatively, a single slot 66 may be configured to provide all needed radial flexure in bushing 90. A rear abutment surface 96 is formed on an inboard end of locking bushing 90 which rides against abutment surface 88 of backup bushing 84 when installed. The arrangement of backup bushing 84 and slip-in bushing 90 permits system 10 to be easily installed within bore 14 by virtue of the cylindrical extension of backup bushing 84. Moreover, backup bushing 84 may be adapted to form only a backup element for slip-in locking bushing 90, or may itself be tapered to cooperate with an outer bushing 36 of the type described above.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A coupling system comprising:

a shaft having a substantially cylindrical outer surface;

a machine element having a bore for receiving the shaft, the bore having an internal cylindrical side wall and a radial recess formed within the side wall;

a first locking member having a substantially cylindrical outer surface configured to bear against the side wall of the bore, a tapered inner surface, and a projection extending radially outwardly from the outer surface configured to be received within the recess;

a second locking member having a substantially cylindrical inner surface configured to bear against the outer surface of the shaft, and a tapered outer surface configured to bear against the tapered inner surface of the first locking member; and means for urging the first and second locking members toward one another, whereby the first and second locking members secure the machine element and shaft in a desired position with respect to one another.

2. The system of claim 1, wherein the recess comprises an annular groove formed in the side wall, and wherein the first locking member includes a plurality of projections configured to be received within the groove.

3. The system of claim 1, wherein the first locking member has a predetermined length and includes an elongated slot extending along the entire length thereof, whereby the first locking member is radially compressible by narrowing the elongated slot.

4. The system of claim 3, wherein the first locking member includes a plurality of recesses extending along a part of the length thereof for facilitating radial compression of the first locking member.

5. The system of claim 1, wherein the means for urging includes a first flange member coupled to the machine element, a second flange member integral with the second locking member and including a flange disposed in mutually facing relation to the first flange member, and means for drawing the second flange member towards the first flange member.

6. The system of claim 5, wherein the means for drawing includes at least one threaded aperture formed in the first flanged member and at least one threaded fastener received within the at least one threaded aperture.

7. The system of claim 1, wherein the bore has first and second open ends and the first locking member is insertable through the first or the second open end.

8. The system of claim 7, wherein the first and second locking members are disposed adjacent to the first open end, and the system further includes a secondary locking assembly disposed adjacent to the second open end for supporting the shaft within the bore.

9. The system of claim 8, wherein the side wall of the bore includes a tapered portion adjacent to the second open end, and wherein the secondary locking assembly comprises a third locking member, the third locking member having a tapered outer surface configured to engage the tapered portion of the side wall to compress the third locking member against the shaft.

10. The system of claim 9, wherein the bore further includes a tapered portion adjacent to the first open end.

11. A coupling system comprising:

a substantially cylindrical shaft;

a machine element having a bore for receiving the shaft, the bore having a cylindrical internal side wall and a radial recess formed in the side wall;

a first locking member having a substantially cylindrical outer surface configured to bear against the side wall of the bore, and a tapered inner surface;

a second locking member having a substantially cylindrical inner surface configured to bear against the shaft, and a tapered outer surface configured to bear against the tapered inner surface of the first locking member;

a backup member having a radial projection configured to be received within the recess, and an axially-extending portion of radially smaller dimensions than the projection, the axially-extending portion configured to bear against the inner surface of the bore, the backup member maintaining the first locking member at a predetermined position within the bore; and means for urging the second locking member and first locking member toward one another.

12. The system of claim 11, wherein the backup member is integral with the second locking member.

13. The system of claim 11, wherein the second locking member abuts the radial projection of the backup member.

14. The system of claim 11, wherein the recess comprises an annular groove formed in the side wall, and wherein the backup member includes a plurality of projections configured to be received within the groove.

15. The system of claim 11, wherein the backup member includes an elongated slot extending through the radial projection and through the axially-extending portion.

16. The system of claim 15, wherein the backup member includes a plurality of radial projections separated from one another by a plurality of slots.

17. A locking bushing shaft coupling system, the system comprising:

a machine element having a bore presenting a cylindrical inner side wall and a radial recess within the side wall;

a shaft having a cylindrical outer wall positionable within the bore;

a locking member having a tapered outer portion and positionable within the bore; and a bushing having an elongated portion having a cylindrical outer surface configured to contact the side wall of the bore, and a tapered inner surface configured to contact the tapered outer portion of the locking member, and a locking projection integral with the elongated portion and extending radially outwardly with respect to the outer surface thereof, the locking projection configured to be received within the recess to maintain the bushing at a predetermined position within the bore.

18. The system of claim 17, wherein the bushing includes an elongated slot extending through the elongated portion and the locking projection.

19. The system of claim 18, wherein the bore includes a first key slot and the shaft includes a second key slot, and wherein the elongated slot of the bushing has a width sufficient to receive a key positioned within the first and second key slots.

20. The system of claim 18, wherein the bushing includes a plurality of second slots extending from a first end thereof along at least a portion of the elongated portion.

21. The system of claim 17, wherein the locking projection of the bushing is one of plurality of locking projections extending radially outwardly with respect to the outer surface of the elongated portion.

22. The system of claim 21, wherein the bushing includes a plurality of second slots extending between pairs of the plurality of locking projections and partially through the elongated portion.

* * * * *